(12) United States Patent
Lentini (10) Patent No.: US 10,451,044 B1
(45) Date of Patent: Oct. 22, 2019

(54) WIND TURBINE ARRAY

(71) Applicant: Pasquale Lentini, Frederick, MD (US)

(72) Inventor: Pasquale Lentini, Frederick, MD (US)

( * ) Notice: Subject to any disclaimer, the term of this patent is extended or adjusted under 35 U.S.C. 154(b) by 30 days.

(21) Appl. No.: 15/944,461

(22) Filed: Apr. 3, 2018

(51) Int. Cl.
| F03D 13/20 | (2016.01) |
| F03D 1/02 | (2006.01) |
| F03D 7/02 | (2006.01) |
| H02J 3/38 | (2006.01) |
| F03D 9/25 | (2016.01) |

(52) U.S. Cl.
CPC ............... *F03D 13/20* (2016.05); *F03D 1/02* (2013.01); *F03D 7/0204* (2013.01); *F03D 9/255* (2017.02); *H02J 3/386* (2013.01); *F05B 2220/706* (2013.01); *F05B 2240/221* (2013.01); *F05B 2240/91* (2013.01); *F05B 2250/12* (2013.01)

(58) Field of Classification Search
CPC .......... F05B 2220/706; F05B 2240/221; F05B 2240/91; F05B 2250/12; F03D 9/255; F03D 1/02; F03D 7/0204; F03D 13/20; H02J 3/386
USPC ..................................................... 290/44, 55
See application file for complete search history.

(56) References Cited

U.S. PATENT DOCUMENTS

| 1,876,595 | A | | 9/1932 | Beldimano | |
| 4,220,870 | A | | 9/1980 | Kelly | |
| 4,278,896 | A | * | 7/1981 | McFarland | F03D 3/02 290/55 |
| 5,642,984 | A | * | 7/1997 | Gorlov | F03B 3/00 416/176 |
| 6,749,399 | B2 | | 6/2004 | Heronemus | |
| 7,075,189 | B2 | * | 7/2006 | Heronemus | B63B 1/047 290/44 |
| 7,528,498 | B2 | | 5/2009 | Yeh | |
| 7,635,924 | B1 | | 12/2009 | Chen | |
| D665,350 | S | | 8/2012 | Presz | |
| 8,937,399 | B2 | | 1/2015 | Freda | |
| 9,771,922 | B2 | * | 9/2017 | Hayman | B63B 21/26 |
| 2006/0232075 | A1 | * | 10/2006 | Fraenkel | F03B 17/061 290/54 |
| 2009/0110554 | A1 | * | 4/2009 | Dukovic | F03D 3/002 416/41 |
| 2014/0083027 | A1 | * | 3/2014 | Haisam | F03D 9/255 52/173.1 |
| 2015/0226185 | A1 | * | 8/2015 | Beekmann | H02J 3/386 290/44 |
| 2015/0292484 | A1 | * | 10/2015 | Haj-Maharsi | F03D 9/10 290/44 |

FOREIGN PATENT DOCUMENTS

GB          344726          3/1931

* cited by examiner

*Primary Examiner* — Charles Reid, Jr.

(57) ABSTRACT

The wind turbine array includes a plurality of wind turbines, a supporting frame, and a bollard. The plurality of wind turbines mount in the supporting frame. The bollard: 1) raises the supporting frame above a supporting surface; 2) transfers the load path of the supporting frame and the plurality of wind turbines to the supporting surface; and, 3) adjusts the azimuth of the supporting frame to optimize the orientation of the plurality of turbines relative to the direction of the wind. The plurality of wind turbines use the wind to generate electricity that is subsequently fed into an electric load.

17 Claims, 6 Drawing Sheets

WIND TURBINE ARRAY

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of mechanical engineering including machines and engines for fluids, more specifically, a mounting assembly for wind motors.

A wind turbine is a rotating mechanical device that converts the wind into electrical power. The wind turbine uses the wind to rotate a blade that in turn rotates a generator that generates electric power. The amount of electrical energy that will be produced by the wind is a function of the area swept of the turbine blades. The current trend in wind turbine design is to increase the length of the turbine blades to increase the swept area of the turbine blades. This effectively increases the speed of the wind turbine and harvests as electricity a higher ration of the energy contained within the wind than the ratio of wind energy that can be harvested from a wind turbine with a smaller swept area.

SUMMARY OF INVENTION

This disclosure presents a different approach to the design of a wind turbine. It is also known that the amount of electrical energy that will be produced by the wind is a function of the surface area of the blades of the turbine as a ratio of the area swept by the turbine blades. The wind turbine array is formed from a plurality of wind turbines that presents a greater blade surface area ratio than current wind turbine designs can provide.

The wind turbine array comprises a plurality of wind turbines, a supporting frame, and a bollard. The plurality of wind turbines mount in the supporting frame. The bollard: 1) raises the supporting frame above a supporting surface; 2) transfers the load path of the supporting frame and the plurality of wind turbines to the supporting surface; and, 3) adjusts the azimuth of the supporting frame to optimize the orientation of the plurality of turbines relative to the direction of the wind. The plurality of wind turbines use the wind to generate electricity that is subsequently fed into an electric load.

These together with additional objects, features and advantages of the wind turbine array will be readily apparent to those of ordinary skill in the art upon reading the following detailed description of the presently preferred, but nonetheless illustrative, embodiments when taken in conjunction with the accompanying drawings.

In this respect, before explaining the current embodiments of the wind turbine array in detail, it is to be understood that the wind turbine array is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the wind turbine array.

It is therefore important that the claims be regarded as including such equivalent construction insofar as they do not depart from the spirit and scope of the wind turbine array. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
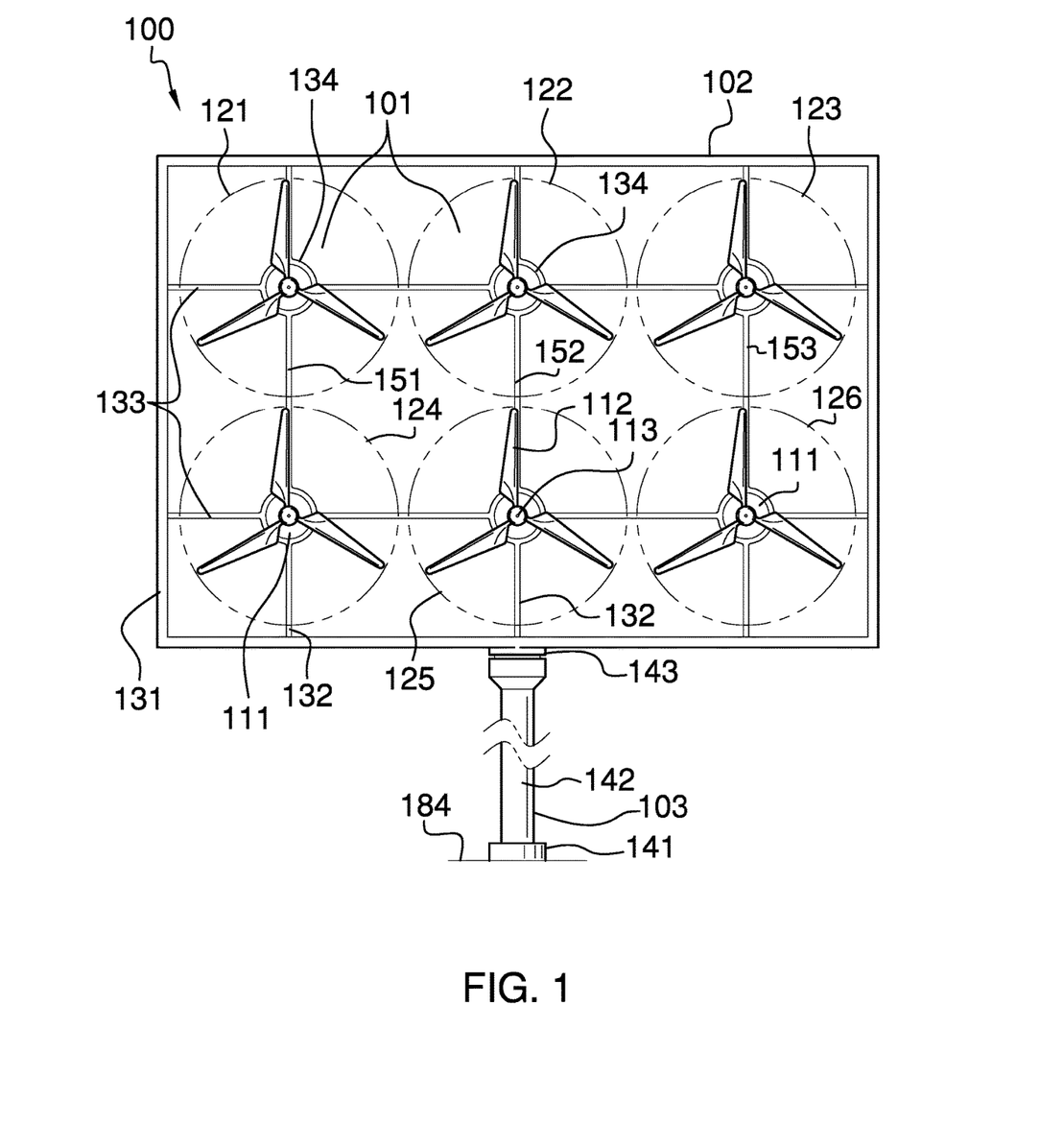
FIG. 1 is a front view of an embodiment of the disclosure.
Figure 2:
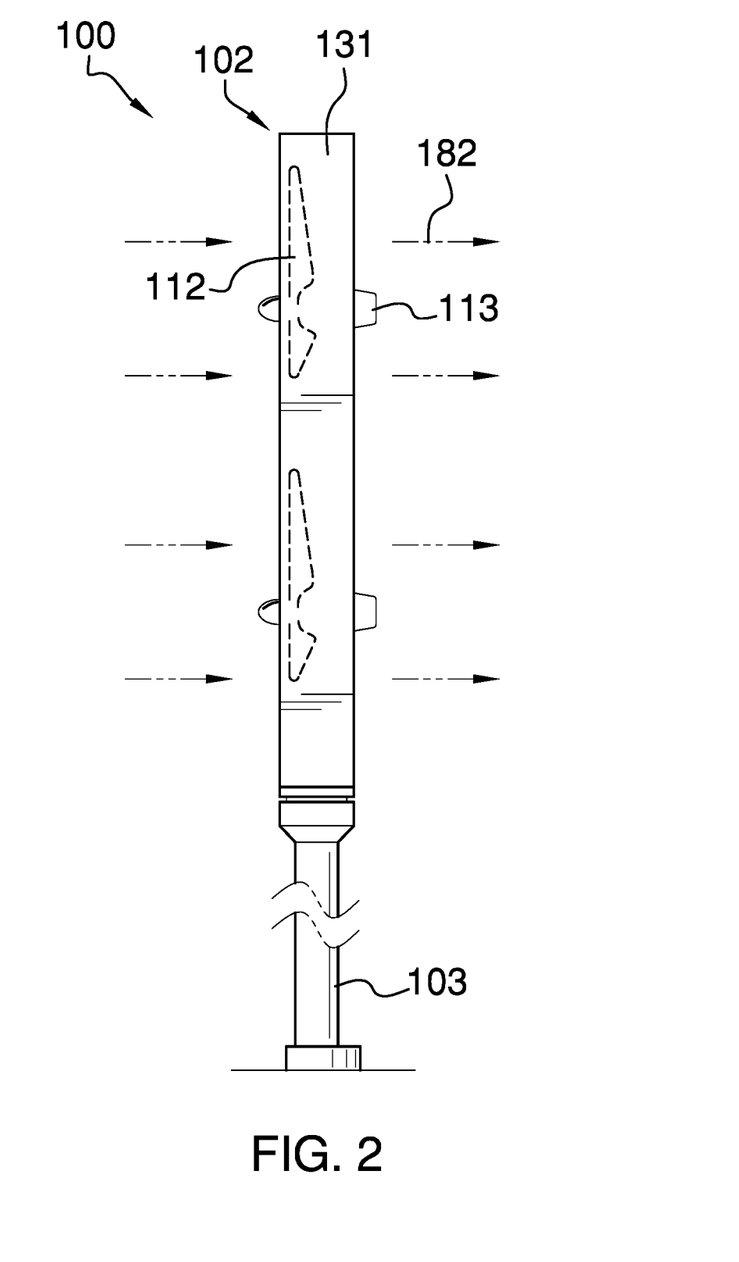
FIG. 2 is a side view of an embodiment of the disclosure.
Figure 3:
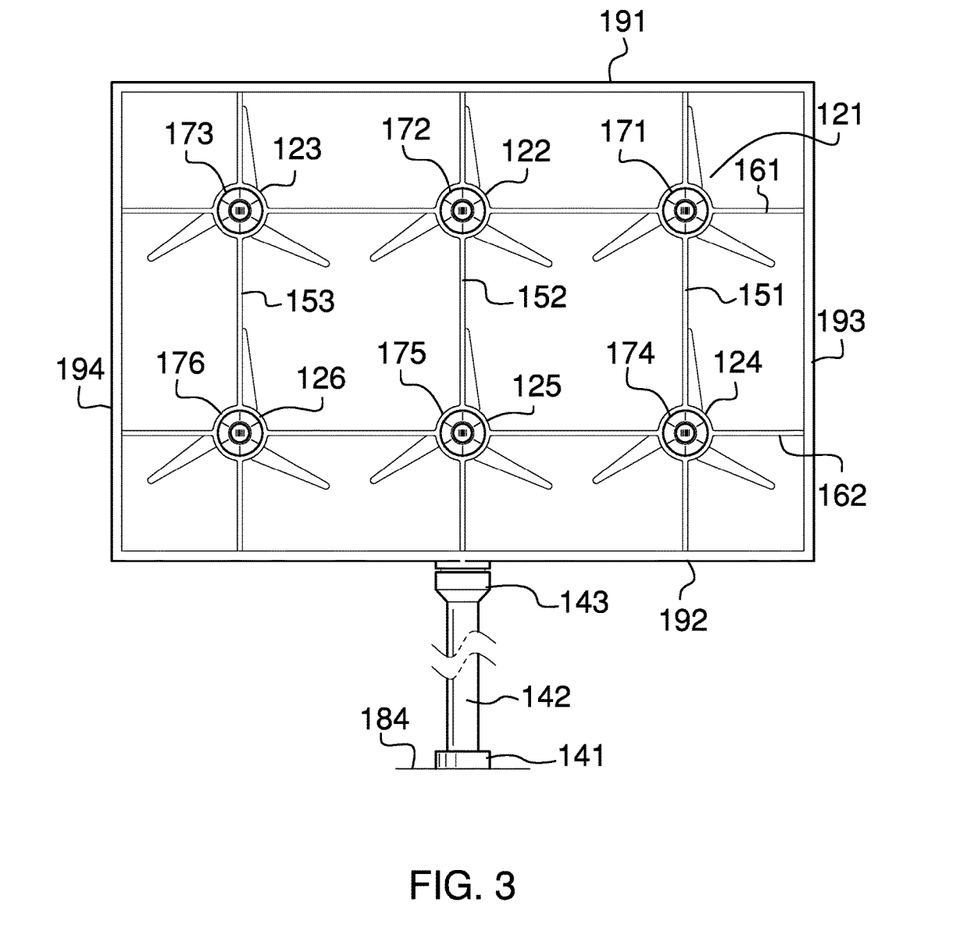
FIG. 3 is a rear view of an embodiment of the disclosure.
Figure 4:
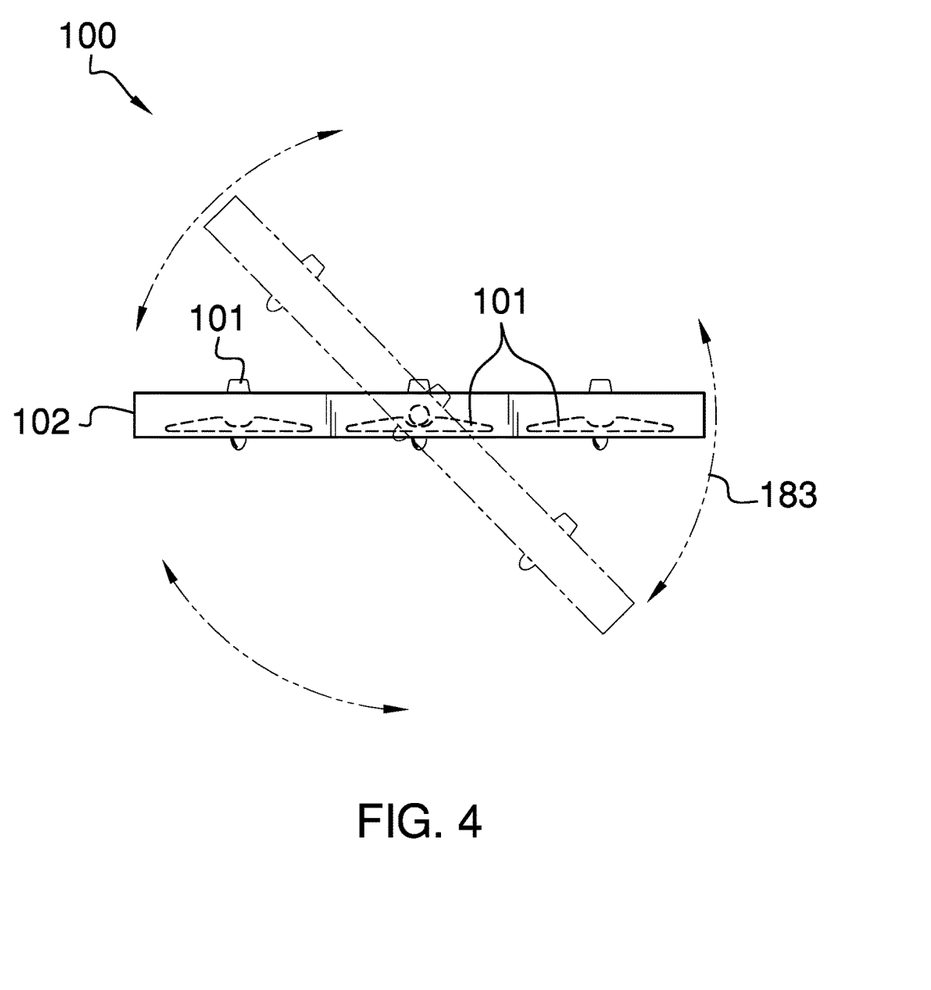
FIG. 4 is a top view of an embodiment of the disclosure.
Figure 5:
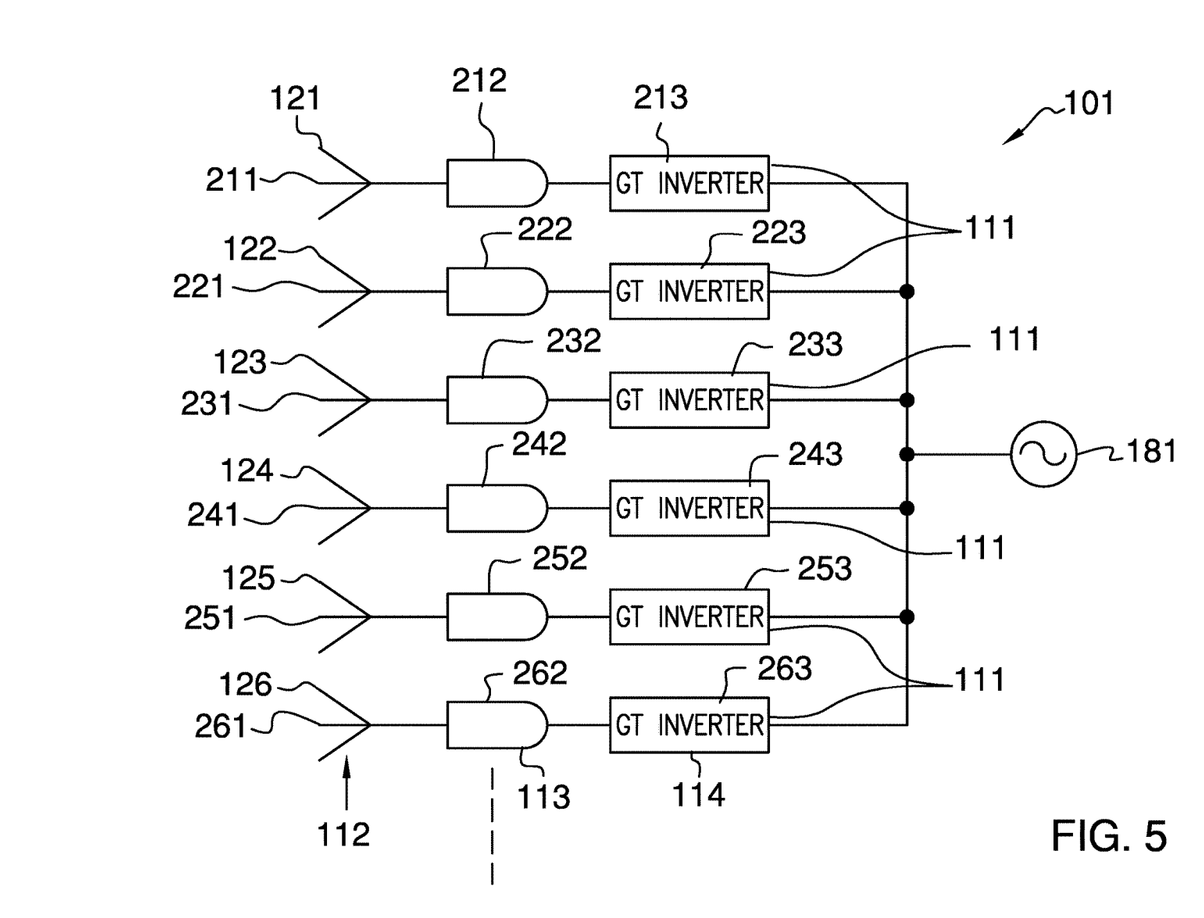
FIG. 5 is a block diagram of an embodiment of the disclosure.
Figure 6:
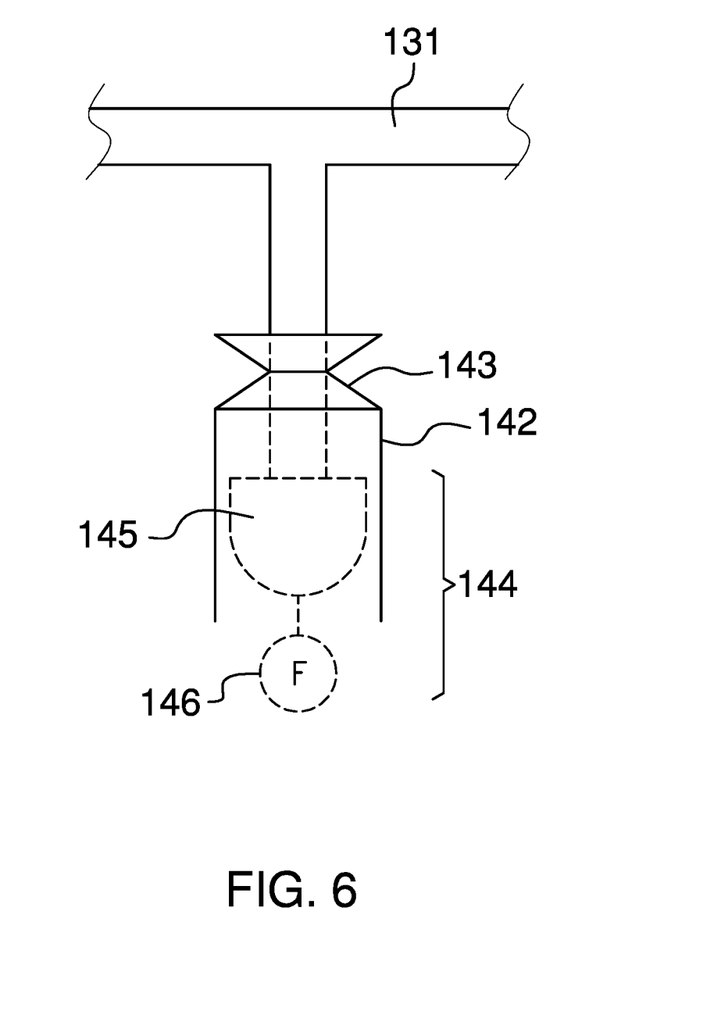
FIG. 6 is a detail view of an embodiment of the disclosure.

Detailed reference will now be made to one or more potential embodiments of the disclosure, which are illustrated in FIGS. 1 through 6.

The wind turbine array 100 (hereinafter invention) comprises a plurality of wind turbines 101, a supporting frame 102, and a bollard 103. The plurality of wind turbines 101 mount in the supporting frame 102. The bollard 103: 1) raises the supporting frame 102 above a supporting surface 184; 2) transfers the load path of the supporting frame 102 and the plurality of wind turbines 101 to the supporting surface 184; and, 3) adjusts the azimuth 183 of the supporting frame 102 to optimize the orientation of the plurality of wind turbines 101 relative to the direction of the wind 182. The plurality of wind turbines 101 use the wind 182 to generate electricity that is subsequently fed into an electrical load 181. The electrical load 181 refers to a device or system that receives the electrical energy created by the plurality of wind turbines 101. In the first potential embodiment of the disclosure, the electrical load 181 is assumed to be a national electric grid.

Each of the plurality of wind turbines 101 is a turbine that converts wind 182 energy into electrical energy. Each of the plurality of wind turbines 101 is identical. Each of the plurality of wind turbines 101 is mounted in the supporting frame 102 to form a turbine array. The plurality of wind turbines 101 comprises a collection of individual wind turbines 111. Each individual wind turbine 111 is identical. Each individual wind turbine 111 comprises a harvest turbine 112, a generator 113, and a grid tie inverter 114.

The individual wind turbine 111 is an electrical generation system that converts the wind 182 into electrical power. Each individual wind turbine 111 contained in the plurality of wind turbines 101 is identical.

The harvest turbine 112 is a rotor. The harvest turbine 112 is a bladed structure. The harvest turbine 112 is a momentum exchange device that is designed to convert the momentum contained in the wind 182 into the angular momentum of the rotation of the harvest turbine 112. The harvest turbine 112 attaches to the generator 113 such that the rotation of the harvest turbine 112 rotates the generator 113.

The generator 113 is an electrical generator. The generator 113 generates electricity as the generator 113 is rotated by the harvest turbine 112. The use of a generator 113 to generate electrical power is well-known and documented in the electrical arts.

The grid tie inverter 114 is an electrical device. The grid tie inverter 114 converts the electrical energy generated by the generator 113 into an electrical power source that is synchronized: 1) with other individual wind turbines 111 selected from the plurality of wind turbines 101; or, 2) a national electric grid. The grid tie inverter 114 is a commercially available device.

In the first potential embodiment of the disclosure, the plurality of wind turbines 101 comprises a first wind turbine 121, a second wind turbine 122, a third wind turbine 123, a fourth wind turbine 124, a fifth wind turbine 125, and a sixth wind turbine 126. The first wind turbine 121, the second wind turbine 122, the third wind turbine 123, the fourth wind turbine 124, the fifth wind turbine 125, and the sixth wind turbine 126 are identical.

The first wind turbine 121 comprises a first harvest turbine 211, a first generator 212, and a first grid tie inverter 213. The first harvest turbine 211 is the harvest turbine 112 associated with the first wind turbine 121. The first generator 212 is the generator 113 associated with the first wind turbine 121. The first grid tie inverter 213 is the grid tie inverter 114 associated with the first wind turbine 121.

The second wind turbine 122 comprises a second harvest turbine 221, a second generator 222, and a second grid tie inverter 223. The second harvest turbine 221 is the harvest turbine 112 associated with the second wind turbine 122. The second generator 222 is the generator 113 associated with the second wind turbine 122. The second grid tie inverter 223 is the grid tie inverter 114 associated with the second wind turbine 122.

The third wind turbine 123 comprises a third harvest turbine 231, a third generator 232, and a third grid tie inverter 233. The third harvest turbine 231 is the harvest turbine 112 associated with the third wind turbine 123. The third generator 232 is the generator 113 associated with the third wind turbine 123. The third grid tie inverter 233 is the grid tie inverter 114 associated with the third wind turbine 123.

The fourth wind turbine 124 comprises a fourth harvest turbine 241, a fourth generator 242, and a fourth grid tie inverter 243. The fourth harvest turbine 241 is the harvest turbine 112 associated with the fourth wind turbine 124. The fourth generator 242 is the generator 113 associated with the fourth wind turbine 124. The fourth grid tie inverter 243 is the grid tie inverter 114 associated with the fourth wind turbine 124.

The fifth wind turbine 125 comprises a fifth harvest turbine 251, a fifth generator 252, and a fifth grid tie inverter 253. The fifth harvest turbine 251 is the harvest turbine 112 associated with the fifth wind turbine 125. The fifth generator 252 is the generator 113 associated with the fifth wind turbine 125. The fifth grid tie inverter 253 is the grid tie inverter 114 associated with the fifth wind turbine 125.

The sixth wind turbine 126 comprises a sixth harvest turbine 261, a sixth generator 262, and a sixth grid tie inverter 263. The sixth harvest turbine 261 is the harvest turbine 112 associated with the sixth wind turbine 126. The sixth generator 262 is the generator 113 associated with the sixth wind turbine 126. The sixth grid tie inverter 263 is the grid tie inverter 114 associated with the sixth wind turbine 126.

The supporting frame 102 is a rectangular framework structure. The azimuth 183 of the supporting frame 102 rotates such that the orientation of the plurality of wind turbines 101 relative to the wind 182 can be adjusted. The azimuth 183 is defined in greater detail elsewhere in this disclosure. By changing the azimuth 183 of the supporting frame 102 the energy transfer between the wind 182 and the plurality of wind turbines 101 can be optimized. The supporting frame 102 comprises a master frame 131, a plurality of stanchions 132, a plurality of beams 133, and a plurality of collars 134.

The master frame 131 is a rectangular structure that forms the outer perimeter of the supporting frame 102. The master frame 131 is further defined with a superior horizontal edge 191, an inferior horizontal edge 192, a first vertical edge 193, and a second vertical edge 194. The superior horizontal edge 191 is the horizontal edge of the master frame 131 that is distal from the supporting surface 184. The inferior horizontal edge 192 is the horizontal edge of the master frame 131 that is distal from the superior horizontal edge 191. The first vertical edge 193 is a vertical edge of the master frame 131 that attaches the superior horizontal edge 191 to the inferior horizontal edge 192. The second vertical edge 194 is a vertical edge of the master frame 131 that is distal from the first vertical edge 193.

Each of the plurality of stanchions 132 is a vertical supporting structure that attaches one or more individual wind turbines 111 to the supporting frame 102. Each of the plurality of stanchions 132 are identical. The plurality of stanchions 132 comprises a first stanchion 151, a second stanchion 152, and a third stanchion 153.

Each of the plurality of beams 133 is a horizontal supporting structure that attaches one or more individual wind turbines 111 to the supporting frame 102. Each of the plurality of beams 133 are identical. The plurality of beams 133 comprises a first beam 161 and a second beam 162.

Each of the plurality of collars 134 is a ring-shaped structure located at each intersection formed by a stanchion selected from the plurality of stanchions 132 and a beam selected from the plurality of beams 133. Each of the plurality of collars 134 are identical. Each collar selected from the plurality of collars 134 physically attaches an individual wind turbine 111 selected from the plurality of wind turbines 101 to the supporting frame 102. The plurality of collars 134 comprises a first collar 171, a second collar 172, a third collar 173, a fourth collar 174, a fifth collar 175, and a sixth collar 176.

The bollard 103 is a supporting structure. The bollard 103 forms a load path that transfers the load of the plurality of wind turbines 101 and the supporting frame 102 to the supporting surface 184. The supporting surface 184 is defined in greater detail elsewhere in this disclosure. The inferior horizontal edge 192 of the supporting frame 102 attaches to the superior end of the bollard 103 such that the supporting frame 102 rotates relative to the bollard 103. The bollard 103 raises the elevation of the plurality of wind turbines 101 and the supporting frame 102 above the supporting surface 184 to optimize the exposure of the plurality of wind turbines 101 to the wind 182. The bollard 103 comprises a pedestal 141, a piling 142, a slewing bearing 143, and an azimuth control 144.

The pedestal 141 is a structure that anchors the piling 142 to the supporting surface 184. The pedestal 141 forms the last link of the load path between the plurality of wind turbines 101 and the supporting frame 102 and the supporting surface 184.

The piling 142 is a stationary vertical column that forms an extension structure. The piling 142 is a prism-shaped structure. The piling 142 supports the plurality of wind turbines 101 and the supporting frame 102 at an elevation above the supporting surface 184. The inferior end of the piling 142 attaches to the pedestal 141.

The slewing bearing 143 attaches to the superior end of the piling 142. The slewing bearing 143 attaches the inferior horizontal edge 192 of the master frame 131 to the superior end of the pedestal 141. The slewing bearing 143 attaches the master frame 131 to the piling 142 such that the master frame 131 rotates relative to the piling 142. The axis of rotation of the slewing bearing 143 aligns with the center axis of the piling 142.

The azimuth control 144 is an electromechanical device that controls the orientation of the plurality of wind turbines 101 relative to the direction of the wind 182 by adjusting the azimuth 183 of the supporting frame 102. The azimuth control 144 further comprises a servo motor 145 and an azimuth feedback circuit 146. The servo motor 145 is a motor that rotates the supporting frame 102 to the desired azimuth 183. The use of a servo motor 145 to control the relative angle between two objects is well-known and documented in the mechanical and electrical arts. The azimuth feedback circuit 146 is an electrical circuit that provides to the servo motor 145 the desired azimuth 183 for the supporting frame 102. Methods to design the azimuth feedback circuit 146 are well-known and documented in the electrical arts.

The following four paragraphs describe the assembly of the invention 100.

The first collar 171 is formed where the first stanchion 151 and the first beam 161 intersect. The second collar 172 is formed where the second stanchion 152 and the first beam 161 intersect. The third collar 173 is formed where the third stanchion 153 and the first beam 161 intersect. The fourth collar 174 is formed where the first stanchion 151 and the second beam 162 intersect. The fifth collar 175 is formed where the second stanchion 152 and the second beam 162 intersect. The sixth collar 176 is formed where the third stanchion 153 and the second beam 162 intersect.

The first collar 171 attaches the first wind turbine 121 to the supporting frame 102. The second collar 172 attaches the second wind turbine 122 to the supporting frame 102. The third collar 173 attaches the third wind turbine 123 to the supporting frame 102. The fourth collar 174 attaches the fourth wind turbine 124 to the supporting frame 102. The fifth collar 175 attaches the fifth wind turbine 125 to the supporting frame 102. The sixth collar 176 attaches the sixth wind turbine 126 to the supporting frame 102.

The first stanchion 151 is a supporting shaft that attaches the superior horizontal edge 191 to the inferior horizontal edge 192. The second stanchion 152 is a supporting shaft that attaches the superior horizontal edge 191 to the inferior horizontal edge 192. The third stanchion 153 is a supporting shaft that attaches the superior horizontal edge 191 to the inferior horizontal edge 192. The first beam 161 is a supporting shaft that attaches the first vertical edge 193 to the second vertical edge 194. The second beam 162 is a supporting shaft that attaches the first vertical edge 193 to the second vertical edge 194.

The slewing bearing 143 attaches the inferior horizontal edge 192 of the master frame 131 to the superior end of the piling 142 of the bollard 103.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anchor: As used in this disclosure, anchor means to hold an object firmly or securely.

Anchor Point: As used in this disclosure, an anchor point is a location to which a first object can be securely attached to a second object.

Azimuth: As used in this disclosure, the azimuth, or azimuth angle, refers to an angle that is measured in a plane that is perpendicular to either the vertical direction or the force of gravity.

Beam: As used in this disclosure, a beam is a horizontally oriented shaft that: 1) is suspended above a supporting surface; and, 2) bears a load.

Bearing: As used in this disclosure, a bearing is a mechanical device that: 1) guides and limits the motion of a moving component relative to a fixed component; and, 2) reduces the friction between the moving component and the fixed component. The use of bearings is well known and documented in the mechanical arts.

Bollard: As used in this disclosure, a bollard is a heavy vertical stanchion used as an anchor point to anchor an object to a supporting surface. Bollards are often called Samson posts.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned.

When the center axes of two cylinder, prism or pyramidal structures do not share the same line they are said to be offset.

Center Axis: As used in this disclosure, the center axis of an object refers to a line that: 1) runs through the center of the object; and, 2) is parallel to the primary sense of direction of the object.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Collar: As used in this disclosure, a collar is a ring-like device that secures an object in a position.

Electric Motor: In this disclosure, an electric motor is a machine that converts electric energy into rotational mechanical energy.

Elevation: As used in this disclosure, elevation refers to the span of the distance in the superior direction between a specified horizontal surface and a reference horizontal surface.

Extension Structure: As used in this disclosure, an extension structure is an inert physical structure that is used to extend the span of the distance between any two objects.

Feedback: As used in this disclosure, feedback refers to a system, including engineered systems, or a subsystem further comprising an "input" and an "output" wherein the difference between the output of the engineered system or subsystem and a reference is used as, or fed back into, a portion of the input of the system or subsystem. Examples of feedback in engineered systems include, but are not limited to, a fluid level control device such as those typically used in a toilet tank, a cruise control in an automobile, a fly ball governor, a thermostat, and almost any electronic device that comprises an amplifier. Feedback systems in nature include, but are not limited to, thermal regulation in animals and blood clotting in animals (wherein the platelets involved in blood clotting release chemical to attract other platelets)

Force of Gravity: As used in this disclosure, the force of gravity refers to a vector that indicates the direction of the pull of gravity on an object at or near the surface of the earth.

Framework: As used in this disclosure, a framework refers to the substructure of an object that carries the load path of the object.

Generator: In this disclosure, a generator is a machine that converts rotational mechanical energy into electric energy.

Grid Tie Inverter: As used in this disclosure, a grid tie inverter is an electric device that converts dc electricity into ac electricity that is synchronized with a national electric grid.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Motor: As used in this disclosure, a motor refers to the method of transferring energy from an external power source into rotational mechanical energy.

National Electric Grid: As used in this disclosure, the national electric grid is a synchronized and highly interconnected electrical network that distributes energy in the form of electric power from a plurality of generating stations to consumers of electricity.

Pedestal: As used in this disclosure, a pedestal is an intermediary load bearing structure that that transfers a load path between a supporting surface and an object, structure, or load.

Piling: As used in this disclosure, a piling is a stanchion that forms the foundation of a larger structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Ring: As used in this disclosure, a ring is term that is used to describe a flat or plate-like structure through which an aperture is formed. Rings are often considered loops.

Rotor: As used in this disclosure, a rotor is: 1) the bladed rotating part of a turbine; or, 2) the rotating part of an electric motor, electric generator, or an alternator.

Servo Motor: As used in this disclosure, a servo motor is an electrical motor that further incorporates a feedback circuit that allows for the precise angular positioning of the electric motor.

Shaft: As used in this disclosure, a shaft is a long, narrow and rigid prism structure used as: 1) a structural element of a larger object; or 2) as a grip or lever for a handle. Shafts are often cylindrical in shape.

Slewing Bearing: As used in this disclosure, a slewing bearing is a device that is used to rotate an object on a horizontal surface. Slewing bearings are often called turntable bearings or a lazy Susan bearing.

Stanchion: As used in this disclosure, a stanchion refers to a vertical pole, post, or support.

Superior: As used in this disclosure, the term superior refers to a directional reference that is parallel to and in the opposite direction of the force of gravity.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Turbine: In this disclosure, a turbine is a machine that converts the kinetic energy of a moving fluid or gas to rotational energy. In common usage, a turbine generally accomplishes this by forcing the moving fluid or gas through a series of blades arrayed around the circumference of a wheel or a cylinder. Alternatively, a turbine can run in a reverse mode wherein externally provided rotational energy will be converted into kinetic energy that is expressed as the movement or compression of a fluid or gas.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wind: As used in this disclosure, wind refers to the movement of atmospheric gases in a single direction.

Wind Turbine: As used in this disclosure, a wind turbine is a turbine that is powered by the wind. Wind turbines are often used to generate electricity.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A power generating array comprising
a plurality of wind turbines, a supporting frame, and a bollard;
wherein the plurality of wind turbines mount in the supporting frame;
wherein the supporting frame is further defined with an azimuth;
wherein the bollard raises the elevation of the supporting frame above a supporting surface
wherein the bollard transfers a load path of the supporting frame and the plurality of wind turbines to the supporting surface;
wherein the plurality of wind turbines use the wind to generate electricity;
wherein the bollard adjusts the azimuth of the supporting frame;
wherein the supporting frame comprises a master frame, a plurality of stanchions, a plurality of beams, and a plurality of collars;
wherein the plurality of stanchions and the plurality of beams attach the plurality of collars to the master frame;
wherein each collar selected from the plurality of collars physically attaches an individual wind turbine selected from the plurality of wind turbines to the supporting frame;
wherein each of the plurality of collars is a ring-shaped structure located at each intersection formed by a stanchion selected from the plurality of stanchions and a beam selected from the plurality of beams;
wherein each of the plurality of collars is identical.

2. The power generating array according to claim 1
wherein each of the plurality of wind turbines is a turbine;
wherein each of the plurality of wind turbines converts wind energy into electrical energy;
wherein each of the plurality of wind turbines is identical;
wherein each of the plurality of wind turbines mounts in the supporting frame to form a turbine array.

3. The power generating array according to claim 2
wherein the supporting frame is a rectangular framework structure;
wherein the azimuth of the supporting frame rotates such that the orientation of the plurality of wind turbines relative to the wind can be adjusted.

4. The power generating array according to claim 3
wherein the bollard is a supporting structure;
wherein the bollard forms the load path that transfers the load of the plurality of wind turbines and the supporting frame to the supporting surface.

5. The power generating array according to claim 4
wherein the plurality of wind turbines comprises a collection of individual wind turbines;
wherein each individual wind turbine comprises a harvest turbine, a generator, and a grid tie inverter;
wherein the harvest turbine is mechanically attached to the generator;
wherein the grid tie inverter is electrically connected to the generator.

6. The power generating array according to claim 5
wherein the harvest turbine is a rotor;
wherein the harvest turbine converts the momentum contained in the wind into an angular momentum stored in a rotation of the harvest turbine.

7. The power generating array according to claim 6
wherein the generator is an electrical generator;
wherein the harvest turbine attaches to the generator such that the rotation of the harvest turbine rotates the generator.

8. The power generating array according to claim 7
wherein the grid tie inverter is an electrical device;
wherein the grid tie inverter converts the electrical energy generated by the generator into an electrical power source that synchronizes with an electrical load selected from the group consisting of: a) the other individual wind turbines selected from the plurality of wind turbines; or, b) a national electric grid.

9. The power generating array according to claim 8
wherein the master frame is a rectangular structure that forms the outer perimeter of the supporting frame;
wherein the master frame is further defined with a superior horizontal edge, an inferior horizontal edge, a first vertical edge, and a second vertical edge.

10. The power generating array according to claim 9
wherein each of the plurality of stanchions is a vertical supporting structure that attaches the one or more individual wind turbines to the supporting frame;
wherein each of the plurality of beams is a horizontal supporting structure that attaches the one or more individual wind turbines to the supporting frame;

wherein each of the plurality of stanchions is identical;
wherein each of the plurality of beams is identical.

11. The power generating array according to claim 10
wherein the bollard comprises a pedestal, a piling, a slewing bearing, and an azimuth control;
wherein the pedestal and the slewing bearing attach to the piling;
wherein the azimuth control controls the azimuth of the supporting frame.

12. The power generating array according to claim 11
wherein the pedestal is a structure that anchors the piling to the supporting surface;
wherein the pedestal forms a last link of the load path between the plurality of wind turbines and the supporting frame and the supporting surface;
wherein the piling is a stationary vertical column that forms an extension structure;
wherein the piling is a prism-shaped structure;
wherein the piling supports the plurality of wind turbines and the supporting frame at an elevation above the supporting surface;
wherein an inferior end of the piling attaches to the pedestal;
wherein the slewing bearing attaches to a superior end of the piling.

13. The power generating array according to claim 12
wherein the slewing bearing attaches the inferior horizontal edge of the master frame to the superior end of the pedestal;
wherein the slewing bearing attaches the inferior horizontal edge of the master frame to the superior end of the piling of the bollard;
wherein the slewing bearing attaches the master frame to the piling such that the master frame rotates relative to the piling;
wherein an axis of rotation of the slewing bearing aligns with a center axis of the piling.

14. The power generating array according to claim 13
wherein the azimuth control is an electromechanical device;
wherein the azimuth control controls an orientation of the plurality of wind turbines relative to the direction of the wind by adjusting the azimuth of the supporting frame;
wherein the azimuth control further comprises a servo motor and an azimuth feedback circuit;
wherein the servo motor is a motor that rotates the supporting frame to a desired azimuth;
wherein the azimuth feedback circuit is an electrical circuit that provides to the servo motor the desired azimuth for the supporting frame.

15. The power generating array according to claim 14
wherein the plurality of wind turbines comprises a first wind turbine, a second wind turbine, a third wind turbine, a fourth wind turbine, a fifth wind turbine, and a sixth wind turbine;
wherein the first wind turbine, the second wind turbine, the third wind turbine, the fourth wind turbine, the fifth wind turbine, and the sixth wind turbine are identical;
wherein the first wind turbine comprises a first harvest turbine, a first generator, and a first grid tie inverter;
wherein the second wind turbine comprises a second harvest turbine, a second generator, and a second grid tie inverter;
wherein the third wind turbine comprises a third harvest turbine, a third generator, and a third grid tie inverter;
wherein the fourth wind turbine comprises a fourth harvest turbine, a fourth generator, and a fourth grid tie inverter;
wherein the fifth wind turbine comprises a fifth harvest turbine, a fifth generator, and a fifth grid tie inverter;
wherein the sixth wind turbine comprises a sixth harvest turbine, a sixth generator, and a sixth grid tie inverter;
wherein the first harvest turbine is the harvest turbine associated with the first wind turbine;
wherein the first generator is the generator associated with the first wind turbine;
wherein the first grid tie inverter is the grid tie inverter associated with the first wind turbine;
wherein the second harvest turbine is the harvest turbine associated with the second wind turbine;
wherein the second generator is the generator associated with the second wind turbine;
wherein the second grid tie inverter is the grid tie inverter associated with the second wind turbine;
wherein the third harvest turbine is the harvest turbine associated with the third wind turbine;
wherein the third generator is the generator associated with the third wind turbine;
wherein the third grid tie inverter is the grid tie inverter associated with the third wind turbine;
wherein the fourth harvest turbine is the harvest turbine associated with the fourth wind turbine;
wherein the fourth generator is the generator associated with the fourth wind turbine;
wherein the fourth grid tie inverter is the grid tie inverter associated with the fourth wind turbine;
wherein the fifth harvest turbine is the harvest turbine associated with the fifth wind turbine;
wherein the fifth generator is the generator associated with the fifth wind turbine;
wherein the fifth grid tie inverter is the grid tie inverter associated with the fifth wind turbine;
wherein the sixth harvest turbine is the harvest turbine associated with the sixth wind turbine;
wherein the sixth generator is the generator associated with the sixth wind turbine;
wherein the sixth grid tie inverter is the grid tie inverter associated with the sixth wind turbine.

16. The power generating array according to claim 15
wherein the plurality of stanchions comprises a first stanchion, a second stanchion, and a third stanchion;
wherein the plurality of beams comprises a first beam and a second beam;
wherein the first stanchion is a supporting shaft that attaches the superior horizontal edge to the inferior horizontal edge;
wherein the second stanchion is a supporting shaft that attaches the superior horizontal edge to the inferior horizontal edge;
wherein the third stanchion is a supporting shaft that attaches the superior horizontal edge to the inferior horizontal edge;
wherein the first beam is a supporting shaft that attaches the first vertical edge to the second vertical edge;
wherein the second beam is a supporting shaft that attaches the first vertical edge to the second vertical edge.

17. The power generating array according to claim 16
wherein the plurality of collars comprises a first collar, a second collar, a third collar, a fourth collar, a fifth collar, and a sixth collar;

wherein the first collar is formed where the first stanchion and the first beam intersect;

wherein the second collar is formed where the second stanchion and the first beam intersect;

wherein the third collar is formed where the third stanchion and the first beam intersect;

wherein the fourth collar is formed where the first stanchion and the second beam intersect;

wherein the fifth collar is formed where the second stanchion and the second beam intersect;

wherein the sixth collar is formed where the third stanchion and the second beam intersect;

wherein the first collar attaches the first wind turbine to the supporting frame;

wherein the second collar attaches the second wind turbine to the supporting frame;

wherein the third collar attaches the third wind turbine to the supporting frame;

wherein the fourth collar attaches the fourth wind turbine to the supporting frame;

wherein the fifth collar attaches the fifth wind turbine to the supporting frame;

wherein the sixth collar attaches the sixth wind turbine to the supporting frame.

* * * * *